US011425731B2

(12) United States Patent
Cui et al.

(10) Patent No.: US 11,425,731 B2
(45) Date of Patent: Aug. 23, 2022

(54) ELECTRONIC DEVICE, WIRELESS COMMUNICATION METHOD AND COMPUTER READABLE MEDIUM FOR MANAGING RESOURCE BLOCKS

(71) Applicant: Sony Corporation, Tokyo (JP)

(72) Inventors: Qimei Cui, Beijing (CN); Jing Liu, Beijing (CN); Tao Cui, Beijing (CN); Xiaofeng Tao, Beijing (CN)

(73) Assignee: SONY CORPORATION, Tokyo (JP)

( * ) Notice: Subject to any disclaimer, the term of this patent is extended or adjusted under 35 U.S.C. 154(b) by 186 days.

(21) Appl. No.: 16/962,524

(22) PCT Filed: May 14, 2019

(86) PCT No.: PCT/CN2019/086737
§ 371 (c)(1),
(2) Date: Jul. 16, 2020

(87) PCT Pub. No.: WO2019/218985
PCT Pub. Date: Nov. 21, 2019

(65) Prior Publication Data
US 2021/0092747 A1  Mar. 25, 2021

(30) Foreign Application Priority Data
May 18, 2018  (CN) .......................... 201810482199.4

(51) Int. Cl.
*H04W 72/08*  (2009.01)
*H04W 72/04*  (2009.01)
*H04W 72/10*  (2009.01)

(52) U.S. Cl.
CPC ..... *H04W 72/085* (2013.01); *H04W 72/0406* (2013.01); *H04W 72/10* (2013.01)

(58) Field of Classification Search
CPC .................................................. H04W 72/085
See application file for complete search history.

(56) References Cited

U.S. PATENT DOCUMENTS

2014/0321377 A1* 10/2014 Ryu .................. H04W 72/1247
370/329
2015/0365941 A1* 12/2015 Liu ........................ H04W 72/06
370/280

(Continued)

FOREIGN PATENT DOCUMENTS

WO   WO-2018075745 A1   4/2018

OTHER PUBLICATIONS

International Search Report and Written Opinion dated Aug. 12, 2019 for PCT/CN2019/086737 filed on May 14, 2019, 10 pages including English Translation of the International Search Report.

(Continued)

*Primary Examiner* — Edan Orgad
*Assistant Examiner* — Won Tae C Kim
(74) *Attorney, Agent, or Firm* — Xsensus LLP (57) ABSTRACT

An electronic device, a wireless communication method, and a computer readable medium, where the electronic device for wireless communication includes a processing circuit. The processing circuit is configured to select resource blocks to be used for automatic uplink transmission from amongst a pre-assigned plurality of resource blocks on an unlicensed band, and implement control to use the selected resource blocks for implementing automatic uplink transmission.

11 Claims, 8 Drawing Sheets

(56) References Cited

U.S. PATENT DOCUMENTS

| | | | |
|---|---|---|---|
| 2017/0230838 A1* | 8/2017 | Yerramalli | H04W 74/0808 |
| 2017/0310531 A1 | 10/2017 | Dinan | |
| 2019/0098657 A1* | 3/2019 | Golitschek Edler von Elbwart | H04W 72/1242 |
| 2019/0335480 A1* | 10/2019 | Sun | H04W 72/14 |
| 2020/0037359 A1* | 1/2020 | Wang | H04W 74/0808 |
| 2020/0314895 A1* | 10/2020 | Bergström | H04W 74/006 |

OTHER PUBLICATIONS

Huawei and Hisilicon, "Consideration on grant free transmission for NR," 3GPP TSG-RAN WG2 Meeting No. 95, R2-165442, Gothenburg, Sweden, Aug. 22-26, 2016, 3 pages.

Huawei and Hisilicon, "Discussion on the priority class for AUL," 3GPP TSG-RAN2 Meeting No. 101, R2-1802255, Athens, Greece, Feb. 26-Mar. 2, 2018, 4 pages.

Huawei and Hisilicon, "Modelling of Grant free and SPS," 3GPP TSG-RAN AdHoc, R2-1707247, Qingdao, China, Jun. 27-29, 2017, 7 pages.

Huawei and Hisilicon, "Transmission with configured grant in NR unlicensed band," 3GPP TSG RAN WG1 Meeting No. 93, R1-1805922, Busan, Korea, May 21-25, 2018, 7 pages.

Intel Corporation, "Potential enhancements to NR configured grants to support unlicensed operation," 3GPP TSG RAN WG1 Meeting No. 93, R1-1806547, Busan, Korea, May 21-25, 2018, pp. 1-5.

Samsung, "Channel access for autonomous UL access," 3GPP TSG RAN WG1 Meeting No. 92, R1-1801917, Athens, Greece, Feb. 26-Mar. 2, 2018, pp. 1-5.

Samsung:"Channel access for autonomous UL access",3GPP Draft;R1-1720248 LBT for AUL,3rd Generation Partnership Project (3GPP),Mobile Competence Centre;650,Route Des Lucioles;F-06921 Sophia-Antipolis Cedex;France vol. RAN WGI,No. Reno,USA;Nov. 27, 2017-Dec. 1, 2017 Nov. 18, 2017 (Nov. 18, 2017),XP051369882, Retrieved from the Internet:URL: http://www.3gpp.org/ftp/tsg%5Fran/WG1%5FRL1/TSGR1%5F91/Docs/ [retrieved on Nov. 18, 2017]*sections:2.1,2.2,2.3,3;p. 2-p. 4*.

Intel Corporation:"Summary of email discussion[90b-LTE-21]on AUL channel access" 3GPP Draft;R1-1720029, 3rd Generation Partnership Project (3GPP), Mobile Competence Centre;650,Route Des Lucioles;F-06921 Sophia-Antipolis Cedex;France vol. RA WG1,n. Reno,US;Nov. 27, 2017-Dec. 1, 2017 Nov. 18, 2017 (Nov. 18, 2017), XP051369711,Retrieved from the Internet:URL:http://www.3gpp.org/ftp/tsg%5Fran/WG1%5FRL1/TSGR1%5F91/Docs/ [retrieved on Nov. 18, 2017]*section:2.1; p. 1-p. 2*section:2.3;p. 9-p. 11 **section:4;p. 13*.

* cited by examiner

ELECTRONIC DEVICE, WIRELESS COMMUNICATION METHOD AND COMPUTER READABLE MEDIUM FOR MANAGING RESOURCE BLOCKS

CROSS-REFERENCE TO RELATED APPLICATIONS

The present application is based on PCT filing PCT/CN2019/086737, filed May 14, 2019, which claims priority to CN 201810482199.4, filed May 18, 2018, the entire contents of each are incorporated herein by reference.

FIELD

The present disclosure generally relates to the field of wireless communications, and in particular to electronic devices and wireless communication methods for user equipment side and base station side, and a computer readable medium.

BACKGROUND

Automatic uplink transmission (AUL) refers to that a base station allocates a resource to a user equipment (UE) for transmission in advance before a data packet arrives at a user, rather than that the user equipment applies to the base station for a resource when a data packet is to be transmitted.

A UE operating on an unlicensed band performs a listen-before-talk (LBT) on a channel, and performs the automatic uplink transmission on the channel when the channel is idle. Since the automatic uplink transmission includes control information for decoding, a base station may receive the control information and decode a remaining part of the automatic uplink transmission. After a wireless link is established, the base station may perform configuration for the automatic uplink transmission of the UE and transmit dynamic configuration information to initialize, interrupt or reconfigure parameters for the automatic uplink transmission.

With the automatic uplink transmission, signaling overhead for applying for and scheduling a resource can be reduced. In a case that a transmission volume is small, the above advantage is particularly significant. In addition, with the automatic uplink transmission, a latency resulted from waiting for an allocated resource can be reduced, and transmission effectiveness can be enhanced.

SUMMARY

When the AUL is performed on an unlicensed band in a conventional manner, a resource is required to be allocated to a user in advance to ensure a low latency, thereby ensuring reliability of a service having high requirements for latency. However, a case that a user to which a resource block is currently allocated has no data packet to be transmitted may occur. Since the resource is allocated in advance, the idle resource block cannot be used by another user to transmit data, resulting in low spectrum utilization to a certain extent.

In addition, since the resource is randomly allocated in the conventional manner, the allocated resource may be not necessarily adapted for a current data transmission service of a user, resulting in that reliability of data transmission may not be ensured.

The present disclosure is proposed in view of at least a part of the above technical problems.

A brief summary of embodiments of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

According to an embodiment, an electronic device for wireless communication is provided. The electronic device includes processing circuitry. The processing circuitry is configured to select, from among multiple resource blocks allocated in advance on an unlicensed band, a resource block to be used for automatic uplink transmission, and perform control to perform the automatic uplink transmission using the selected resource block.

According to another embodiment, a wireless communication method is provided. The wireless communication method includes: selecting, from among multiple resource blocks allocated in advance on an unlicensed band, a resource block to be used for automatic uplink transmission; and performing the automatic uplink transmission using the selected resource block.

According to another embodiment, an electronic device for wireless communication is provided. The electronic device includes processing circuitry. The processing circuitry is configured to allocate multiple resource blocks on an unlicensed band jointly for multiple user equipments. The multiple resource blocks are used for automatic uplink transmission. The processing circuitry is further configured to perform control to receive uplink transmission performed by one of the multiple user equipments using a resource block selected from among the multiple resource blocks.

According to another embodiment, a wireless communication method is provided. The wireless communication method includes: allocating multiple resource blocks on an unlicensed band jointly for multiple user equipments, the multiple resource blocks being used for automatic uplink transmission; and receiving uplink transmission performed by one of the multiple user equipments using a resource block selected from among the multiple resource blocks.

A computer readable medium is further provided according to an embodiment of the present disclosure. The computer readable medium includes executable instructions that, when executed by an information processing apparatus, cause the information processing apparatus to execute the methods according to the above embodiments.

With the embodiments of the present disclosure, the spectrum utilization can be improved.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

Embodiments of the present disclosure are described below with reference to the drawings. Elements and features described in one of the drawings or one of the embodiments of the present disclosure may be combined with elements and features described in one or more other drawings or embodiments. It should be noted that representations and descriptions of components and processing which are irrelevant to the present disclosure or known by those skilled in the art are omitted in the drawings and the specification for clarity.

Figure 1:
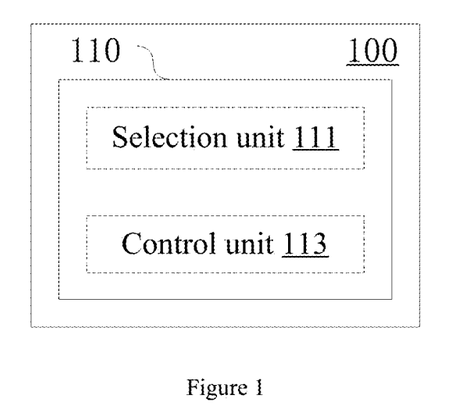
FIG. 1 is a block diagram showing a configuration example of an electronic device for wireless communication according to an embodiment of the present disclosure.

As shown in FIG. 1, an electronic device 100 for wireless communication according to an embodiment includes processing circuitry 110. The processing circuitry 110 may be implemented as, for example, a specific chip, a chipset, or a central processing unit (CPU).

The processing circuitry 110 includes a selection unit 111 and a control unit 113. It should be noted that, although the selection unit 111 and the control unit 113 are shown in a form of functional block in the drawings, it should be understood that functions of these units may also be implemented by the processing circuitry as a whole, and are unnecessarily implemented by discrete actual components in the processing circuitry. In addition, although the processing circuitry is shown as one block in the drawings, the electronic device may include multiple processing circuitry. The functions of these units may be distributed to the multiple processing circuitry, so that the multiple processing circuitry cooperate to perform these functions.

The selection unit 111 is configured to select, from among multiple resource blocks (for example, Bandwidth Part) allocated in advance on an unlicensed band, a resource block to be used for automatic uplink transmission.

The control unit 113 is configured to perform control to perform the automatic uplink transmission using the resource block selected by the selection unit 111.

According to an embodiment, multiple resource blocks are allocated jointly for multiple user equipments by a base station. For example, the base station may allocate the multiple resource blocks via radio resource control (RRC) signaling. Resource blocks are partitioned, for example, by a network layer.

Figure 8:
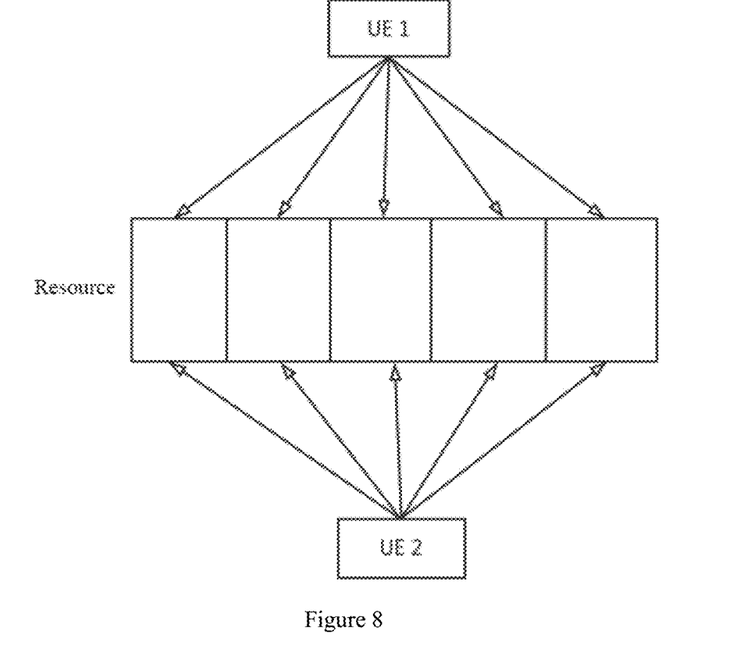
FIG. 8 is a schematic diagram showing a manner for allocating resources.

As shown in FIG. 8, same multiple resource blocks are allocated to a UE1 and a UE2 to avoid a case of low resource utilization resulted from that a resource block is allocated to one UE only in advance but the UE has no data packet to be transmitted.

Based on the above embodiments, in order to discriminate all idle resource blocks, priorities may be allocated for all current idle resource blocks based on whether a resource block satisfies a service requirement of a data packet to be transmitted by a UE. In a case that a transmission service changes, the priorities may change. Since a UE may preferentially select a resource block having a high priority from the all current idle resource blocks. A resource block that matches a transmission mode of the UE may be selected for the UE.

Figure 2:
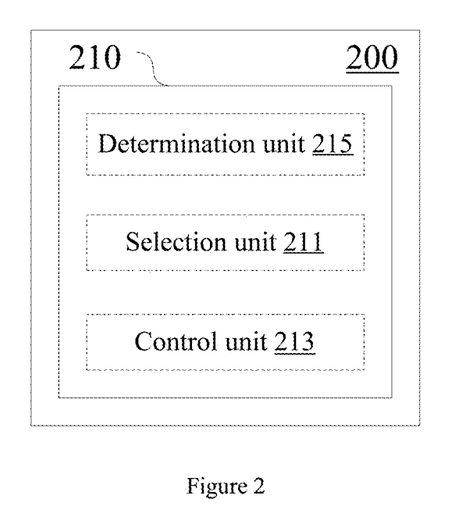
FIG. 2 is a block diagram showing a configuration example of an electronic device for wireless communication according to another embodiment.

FIG. 2 shows a configuration example of an electronic device for wireless communication according to another embodiment.

An electronic device 200 according to this embodiment includes processing circuitry 210. The processing circuitry 210 includes a selection unit 211, a control unit 213 and a determination unit 215. The selection unit 211 and the control unit 213 are similar to the selection unit 111 and the control unit 113 described above, respectively.

The determination unit 215 is configured to determine a priority of each resource block of the multiple resource blocks.

The selection unit 211 is configured to select a resource block to be used for the automatic uplink transmission based on the priority determined by the determination unit 215.

According to an embodiment, the determination unit 215 is configured to determine the priority for each of multiple types of uplink services. The selection unit 211 is configured to select a resource block to be used for an uplink service of a corresponding type based on the priority determined by the determination unit 215.

Figure 9:
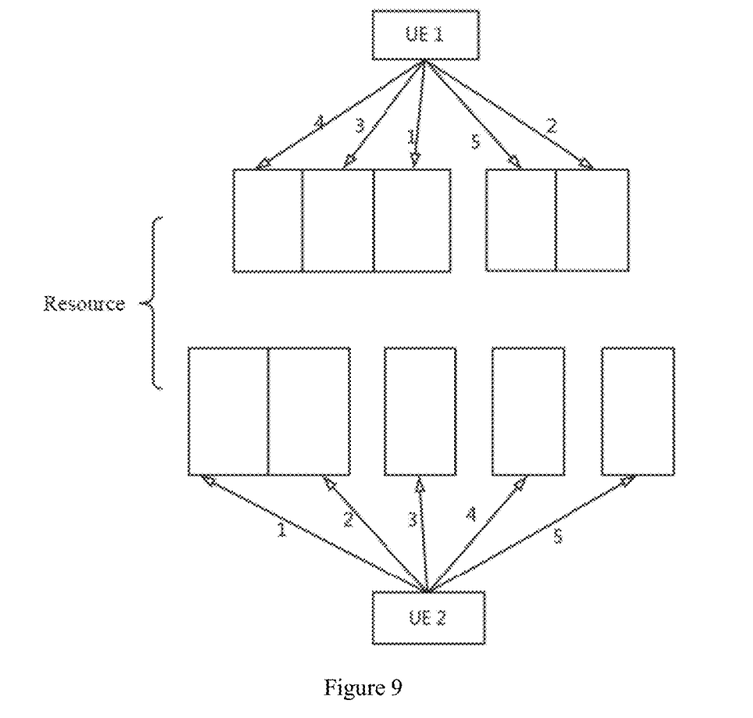
FIG. 9 is a schematic diagram showing a manner for allocating resources.

FIG. 9 is a schematic diagram showing a corresponding mode of resource blocks having priorities for two UEs carrying different services on non-contiguous resource blocks.

In addition, the multiple types of uplink services may include uplink services having different requirements in terms of latency and/or transmission data volume. For example, the multiple types of uplink services may include an ultra reliable low latency communications (URLLC) service and an enhanced mobile broadband (eMBB) service.

Accordingly, the determination unit 215 may be configured to: for the URLLC service, set a higher priority for a resource block having a lower latency; and for the eMBB service, set a higher priority for a larger source block.

In an example shown in FIG. 9, it is assumed that a UE1 carries the URLLC service and a UE2 carries the eMBB service. Numbers represent priorities of source blocks correspondingly allocated for two UEs. Since a data packet in an eMBB transmission mode is generally large, one large source block or multiple contiguous source blocks may be required to be allocated for one eMBB data packet to satisfy transmission requirements. In addition, since an URLLC data packet is smaller than the eMBB data packet, a source block allocated for the URLLC is smaller than a source block allocated for the eMBB.

A priority of a source block is mainly used to reflect transmission capability. For example, the URLLC generally requires a low latency of transmission and retransmission, and the eMBB generally requires a large source block.

In addition, an MCOT of channel access is related to transmission and retransmission. A small MCOT generally corresponds to a low latency. Therefore, for the URLLC service, a priority may be related to an MCOT of uplink channel access.

Accordingly, according to an embodiment, for the URLLC service, the determination unit 215 may be configured to set a higher priority for a resource block having a smaller maximum channel occupancy time MCOT.

In addition, the priority may be determined based on feedback of a LBT performed on each resource block by a UE.

Figure 3:
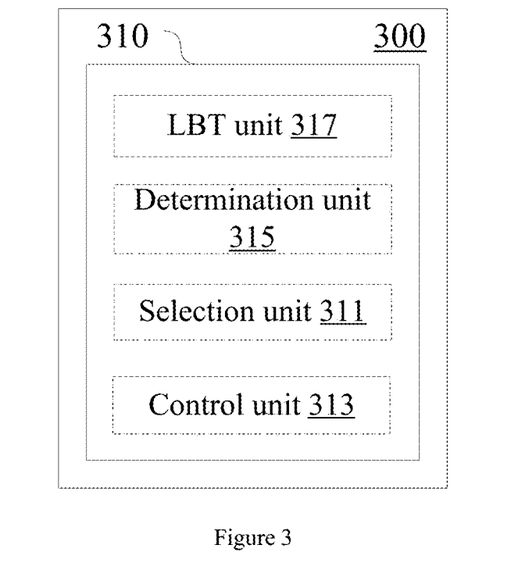
FIG. 3 is a block diagram showing a configuration example of an electronic device for wireless communication according to another embodiment.

FIG. 3 shows a configuration example of an electronic device for wireless communication according to another embodiment.

An electronic device 300 according to this embodiment includes processing circuitry 310. The processing circuitry 310 includes a selection unit 311, a control unit 313, a determination unit 315 and an LBT unit 317. The selection unit 311, the control unit 313 and the determination unit 315 are similar to the selection unit 211, the control unit 213 and the determination unit 215 described above, respectively.

The LBT unit 317 is configured to perform control to perform a first listen-before-talk for each of the multiple resource blocks. The determination unit 315 is configured to determine priorities of the multiple resource blocks based on a result of the first listen-before-talk.

For example, for the eMBB or the URLLC, a priority of a resource is mainly related to feedback of an LBT performed on the resource. That is, a resource allocated in advance is in a semi-activated state, and a priority of a resource block on which the LBT is completed fastest is 1 (a highest priority). In a case that multiple LBTs are completed simultaneously, the priority may be determined based on a size of a data packet.

In order to satisfy requirements for the latency of the URLLC, an MCOT of a resource block allocated for the URLLC is required to be small. Therefore, in a case that a service is determined as the URLLC, a channel access priority corresponding to the service may be determined based on a type of the service, so that various parameters for performing the LBT are determined, and then the LBT is performed based on the parameters. For all idle resource blocks, a resource block on which the LBT is completed fastest has a highest priority, which means a low latency. For the eMBB service, the priority may be determined based on the size of the data packet and the feedback of the LBT.

According to an embodiment, the LBT unit 317 may further be configured to, before performing the uplink transmission using the selected resource block, perform a second listen-before-talk with respect to the selected resource block.

Further, the selection unit 311 is further configured to, in a case where the second listen-before-talk fails or the uplink transmission fails, perform the uplink transmission using another resource block having a priority lower than the selected resource block.

In addition, the LBT unit 317 may further be configured to, for uplink services of different types, set different start timings for the second listen-before-talk.

More specifically, the LBT unit 317 may be configured to set a start timing of the second listen-before-talk for the URLLC service to be earlier than a start timing of the second listen-before-talk for the eMBB service.

For example, in a case that an idle resource block is to be allocated in advance for multiple UEs carrying URLLC transmission mode and eMBB transmission mode, since the URLLC requires a high priority, the idle resource block is finally preferentially allocated to a UE carrying the URLLC service. In order to achieve this mechanism, a starting time instant at which the LBT is performed for the URLLC service may be earlier than a starting time instant at which the LBT is performed for the eMBB service. In a case that the multiple UEs carry one type of service (for example, the URLLC service only or the eMBB service only), the priority of resource may be still used. In this case, which one of the multiple UEs may successfully access the channel may be determined based on an order in which the multiple UEs try to access the channel. A channel having a high priority is preferentially accessed. A UE that does not access the channel tries to access a resource block having a low priority.

In the above description of the electronic devices according to the embodiments of the present disclosure, it is apparent that some processes and methods are also disclosed. Next, the wireless communication methods according to the embodiments of the present disclosure are described without repeating details described above.

Figure 4:
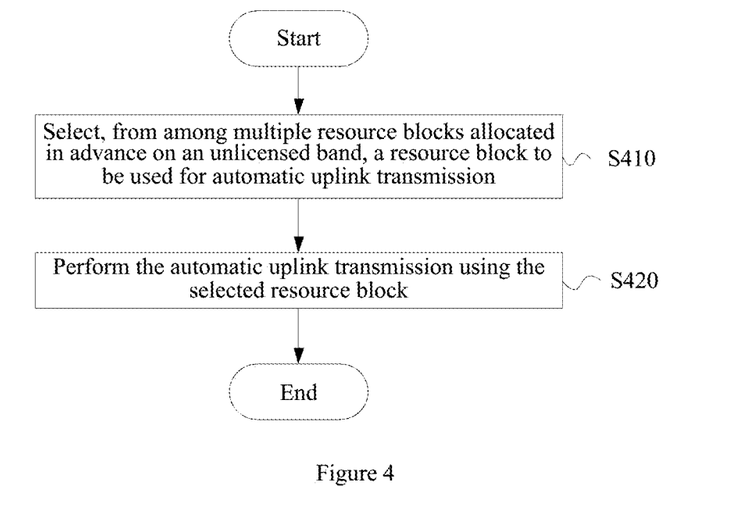
FIG. 4 is a flowchart showing a process example of a wireless communication method according to an embodiment of the present disclosure.

As shown in FIG. 4, a wireless communication method according to an embodiment includes the following steps S410 to S420.

In step S410, a resource block to be used for automatic uplink transmission is selected from among multiple resource blocks allocated in advance on an unlicensed band.

In step S420, the automatic uplink transmission is performed using the selected resource block.

The embodiments of the present disclosure may be implemented at a user equipment side as described above. In addition, the embodiments of the present disclosure may also be implemented at a base station side.

Figure 5:
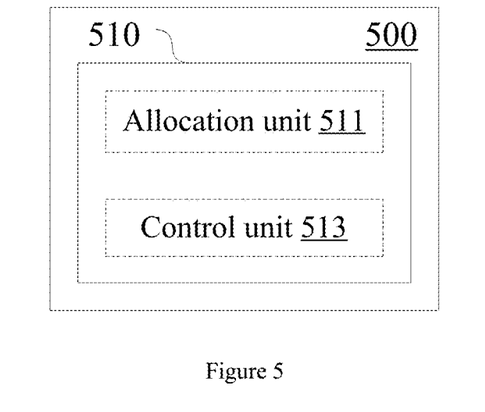
FIG. 5 is a block diagram showing a configuration example of an electronic device for wireless communication according to an embodiment of the present disclosure.

As shown in FIG. 5, an electronic device 500 for wireless communication according to an embodiment includes processing circuitry 510. The processing circuitry 510 includes an allocation unit 511 and a control unit 513.

The allocation unit 511 is configured to allocate multiple resource blocks on an unlicensed band jointly for multiple user equipments. The multiple resource blocks are used for automatic uplink transmission.

The control unit 513 is configured to perform control to receive uplink transmission performed by one of the multiple user equipments using a resource block selected from among the multiple resource blocks.

In addition, the control unit 513 is further configured to perform control to notify the multiple user equipments of the multiple resource blocks via radio resource control signaling.

The allocation unit 511 is further configured to determine the multiple resource blocks, such that the determined multiple resource blocks are adapted for uplink services having different requirements in terms of latency and/or transmission data volume, respectively.

For a UE, different resource blocks correspond to different transmission results. In a case that all idle resource blocks are in different spectrum states, a case that a resource block randomly allocated to a UE cannot satisfy a transmission requirement of the UE may occur. For example, in a case that a data packet to be transmitted by the UE is for the URLLC service and a resource block allocated to the UE has a high latency, the resource block cannot be used for transmission. In addition, since resource blocks on an unlicensed band are small and non-contiguous, in a case that it is required to simultaneously allocate resources for multiple UEs carrying different services in advance, not all idle resource blocks satisfy all transmission requirements.

Resource blocks adapted for uplink services having different requirements are provided, such that a UE can select a resource block that is adapted for a current transmission, thereby ensuring reliability of transmissions.

Figure 6:
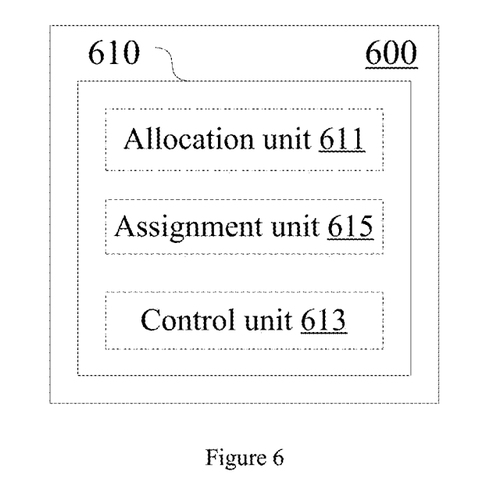
FIG. 6 is a block diagram showing a configuration example of an electronic device for wireless communication according to another embodiment.

FIG. 6 shows a configuration example of an electronic device for wireless communication according to another embodiment.

An electronic device 600 according to the embodiment includes processing circuitry 610. The processing circuitry 610 includes an allocation unit 611, a control unit 613 and an assignment unit 615. Configurations of the allocation unit 611 and the control unit 613 are similar to those of the allocation unit 511 and the control unit 513 described above, respectively.

The assignment unit 615 is configured to assign a priority for each resource block of the allocated multiple resource blocks. In addition, the control unit 613 is further configured to perform control to notify the multiple user equipments of the determined priority.

Figure 7:
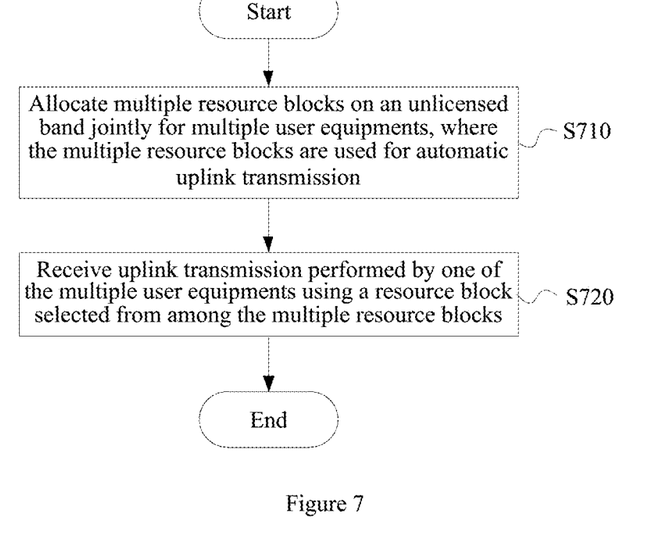
FIG. 7 is a flowchart showing a process example of a wireless communication method according to an embodiment of the present disclosure.

FIG. 7 shows a process example of a wireless communication method according to an embodiment.

The method includes a step S710 of allocating multiple resource blocks on an unlicensed band jointly for multiple user equipments. The multiple resource blocks are used for automatic uplink transmission.

The method further includes a step S720 of receiving uplink transmission performed by one of the multiple user equipments using a resource block selected from among the multiple resource blocks.

A computer readable medium is further provided according to an embodiment of the present disclosure. The computer readable medium includes executable instructions that, when executed by an information processing apparatus, cause the information processing apparatus to execute the methods according to the above embodiments.

For example, steps of the above methods and modules and/or units of the above devices may be implemented as software, firmware, hardware, or a combination thereof. In a case that steps of the above methods and modules and/or units of the above devices are implemented by software or firmware, a computer (for example, a general-purpose computer 1000 shown in FIG. 10) having a dedicated hardware structure may be installed with a program constituting software for implementing the above methods from a storage medium or a network. When being installed with various programs, the computer is capable of performing various functions.

Figure 10:
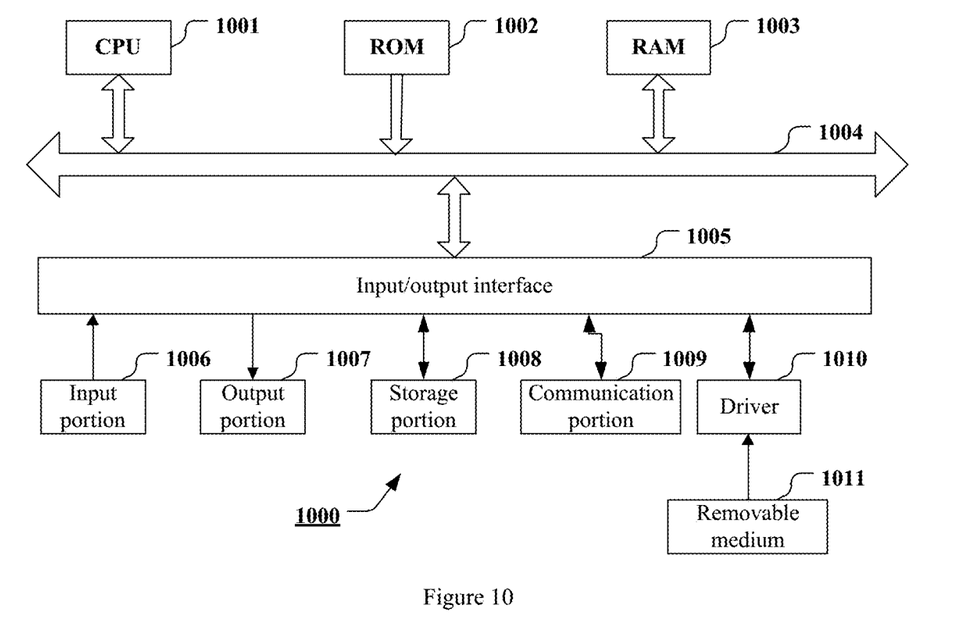
FIG. 10 is a block diagram showing an exemplary structure of a computer for implementing the methods and apparatuses according to the present disclosure.

In FIG. 10, an arithmetic processing unit (that is, a CPU) 1001 performs various processing in accordance with a program stored in a read only memory (ROM) 1002 or a program loaded from a storage portion 1008 to a random access memory (RAM) 1003. The data required for the various processing performed by the CPU 1001 may be stored in the RAM 1003 as needed. The CPU 1001, the ROM 1002 and the RAM 1003 are linked to each other via a bus 1004. An input/output interface 1005 is also linked to the bus 1004.

The following components are linked to the input/output interface 1005: an input portion 1006 (including a keyboard, a mouse or the like), an output portion 1007 (including a display such as a cathode ray tube (CRT), a liquid crystal display (LCD), a loudspeaker or the like), a storage portion 1008 (including a hard disk or the like), and a communication portion 1009 (including a network interface card such as a LAN card, a modem or the like). The communication portion 1009 performs communication processing via a network such as the Internet. A driver 1010 may also be linked to the input/output interface 1005 as needed. A removable medium 1011 such as a magnetic disk, an optical disk, a magneto-optical disk, a semiconductor memory may be installed on the driver 1010 as needed, so that a computer program read from the removable medium 1011 is installed into the storage portion 1008 as needed.

In a case that the above series of processing are implemented by software, a program constituting the software is installed from a network such as the Internet, or a storage medium such as the removable medium 1011.

Those skilled in the art should understand that the storage medium is not limited to the removable medium 1011 shown in FIG. 10 that stores a program and is distributed separately from the apparatus so as to provide the program to the user. The removable medium 1011, for example, may include: a magnetic disk (including a floppy disk (registered trademark)); an optical disk (including a compact disk read only memory (CD-ROM) and a digital versatile disc (DVD)); a magneto-optical disk (including a minidisc (MD) (registered trademark)); and a semiconductor memory. Alternatively, the storage medium may be the ROM 1002, a hard disk included in the storage portion 1008 or the like. The storage medium has a program stored therein and is distributed to the user together with an apparatus in which the storage medium is included.

A program product storing machine-readable instruction codes is further provided according to an embodiment of the present disclosure. The instruction codes, when being read and executed by a machine, may perform the methods according to the above embodiments of the present disclosure.

Accordingly, a storage medium for carrying the program product storing the machine-readable instruction codes is also provided according to the present disclosure. The storage medium may include but is not limited to a floppy disk, an optical disk, a magneto-optical disk, a memory card, a memory stick or the like.

The following electronic apparatus is involved in the embodiments of the present disclosure. In a case that the electronic apparatus is used for base station side, the electronic apparatus may be implemented as any type of gNB or evolved node B (eNB), such as a macro eNB and a small eNB. The small eNB may be an eNB of a cell having a smaller coverage than a macro cell, such as a pico-cell eNB, a micro eNB and a home (femto) eNB. Alternatively, the electronic apparatus may be implemented as any other types of base stations, such as a NodeB and a base transceiver station (BTS). The electronic apparatus may include: a main body (also referred to as a base station apparatus) configured to control the wireless communication; and one or more remote radio heads (RRH) provided at a different position from the main body. In addition, various types of terminals, which are described below, may each serve as a base station by performing functions of the base station temporarily or semi-persistently.

In a case that the electronic apparatus is used for user equipment side, the electronic apparatus may be implemented as a mobile terminal (such as a smartphone, a tablet personal computer (PC), a notebook PC, a portable game terminal, a portable/dongle mobile router and a digital camera) or a vehicle terminal (such as an automobile navigation apparatus). Furthermore, the electronic apparatus may be a wireless communication module (such as an integrated circuitry module including a single die or multiple dies) mounted on each of the terminals described above.

Application Example for a Terminal Apparatus

Figure 11:
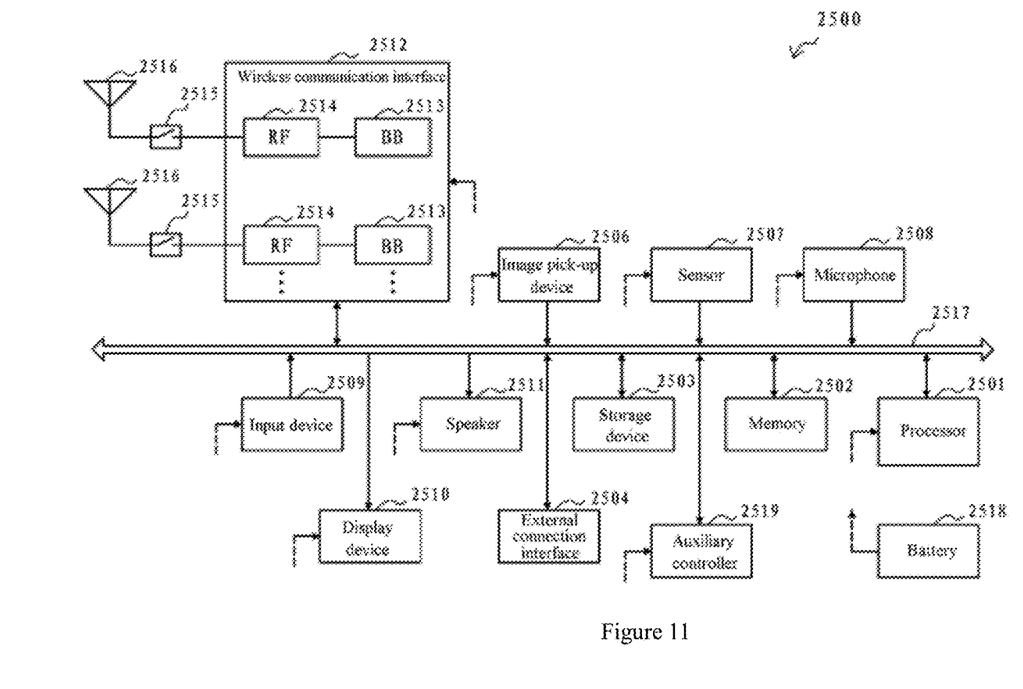
FIG. 11 is a block diagram showing an exemplary configuration of a smart phone to which technology according to the present disclosure may be applied.

FIG. 11 is a block diagram showing an exemplary configuration of a smartphone 2500 to which technology according to the present disclosure may be applied. The smartphone 2500 includes a processor 2501, a memory 2502, a storage device 2503, an external connection interface 2504, an image pick-up device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, a CPU or a system on chip (SoC), and controls functions of an application layer and another layer of the smartphone 2500. The memory 2502 includes an RAM and an ROM, and stores data and a program executed by the processor 2501. The storage device 2503 may include a storage medium such as a semiconductor memory and a hard disk. The external connection interface 2504 is an interface for connecting an external device (such as a memory card and a universal serial bus (USB) device) to the smartphone 2500.

The image pick-up device 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sound that is inputted to the smartphone 2500 into an audio signal. The input device 2509 includes, for example, a touch sensor configured to detect touch on a screen of the display device 2510, a keypad, a keyboard, a button, or a switch, and receives an operation or information inputted from a user. The display device 2510 includes a screen (such as a liquid crystal display (LCD) and an organic light-emitting diode (OLED) display), and displays an output image of the smartphone 2500. The speaker 2511 is configured to convert an audio signal outputted from the smartphone 2500 into sound.

The wireless communication interface 2512 supports any cellular communication scheme (such as LTE and LTE-Advanced), and performs wireless communication. The wireless communication interface 2512 may include, for example, a baseband (BB) processor 2513 and radio frequency (RF) circuitry 2514. The BB processor 2513 may perform, for example, coding/decoding, modulating/demodulating and multiplexing/de-multiplexing, and perform various types of signal processing for wireless communications. The RF circuitry 2514 may include, for example, a mixer, a filter and an amplifier, and transmits and receives a wireless signal via an antenna 2516. The wireless communication interface 2512 may be a chip module having the BB processor 2513 and the RF circuitry 2514 integrated thereon. As shown in FIG. 11, the wireless communication interface 2512 may include multiple BB processors 2513 and multiple RF circuitries 2514. Although FIG. 11 shows an example in which the wireless communication interface 2512 includes the multiple BB processors 2513 and the multiple RF circuitries 2514, the wireless communication interface 2512 may include a single BB processor 2513 or single RF circuitry 2514.

Besides the cellular communication scheme, the wireless communication interface 2512 may support an additional type of wireless communication scheme, such as a short-distance wireless communication scheme, a near field communication scheme and a wireless local area network (LAN) scheme. In this case, the wireless communication interface 2512 may include the BB processor 2513 and the RF circuitry 2514 for each wireless communication scheme.

Each of the antenna switches 2515 switches connection destinations of the antennas 2516 among multiple circuitry (such as circuitry for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive a wireless signal. The smartphone 2500 may include multiple antennas 2516, as shown in FIG. 11. Although FIG. 11 shows an example in which the smartphone 2500 includes the multiple antennas 2516, the smartphone 2500 may also include a single antenna 2516.

In addition, the smartphone 2500 may include an antenna 2516 for each type of wireless communication scheme. In this case, the antenna switches 2515 may be omitted from the configuration of the smartphone 2500.

The processor 2501, the memory 2502, the storage device 2503, the external connection interface 2504, the image pick-up device 2506, the sensor 2507, the microphone 2508, the input device 2509, the display device 2510, the speaker 2511, the wireless communication interface 2512, and the auxiliary controller 2519 are connected to each other via the bus 2517. The battery 2518 supplies power to blocks of the smartphone 2500 shown in FIG. 11 via feeders which are partially shown with dashed lines in the drawings. The auxiliary controller 2519, for example, operates a minimum necessary function of the smartphone 2500 in a sleep mode.

In the smart phone 2500 shown in FIG. 11, the transceiving device of the apparatus for user equipment side according to an embodiment of the present disclosure may be implemented by the wireless communication interface 2512. At least a part of functions of the processing circuitry and/or units of the electronic device or the information processing apparatus for user equipment side according to the embodiments of the present disclosure may be implemented by the processor 2501 or the auxiliary controller 2519. For example, the auxiliary controller 2519 may perform a part of functions of the processor 2501, to reduce power consumption of the battery 2518. Further, the processor 2501 or the auxiliary controller 2519 may perform at least a part of functions of the processing circuitry and/or the units of the electronic device or the information processing apparatus for user equipment side according to the embodiments of the present disclosure by executing a program stored in the memory 2502 or the storage device 2503.

Application Example for a Base Station

Figure 12:
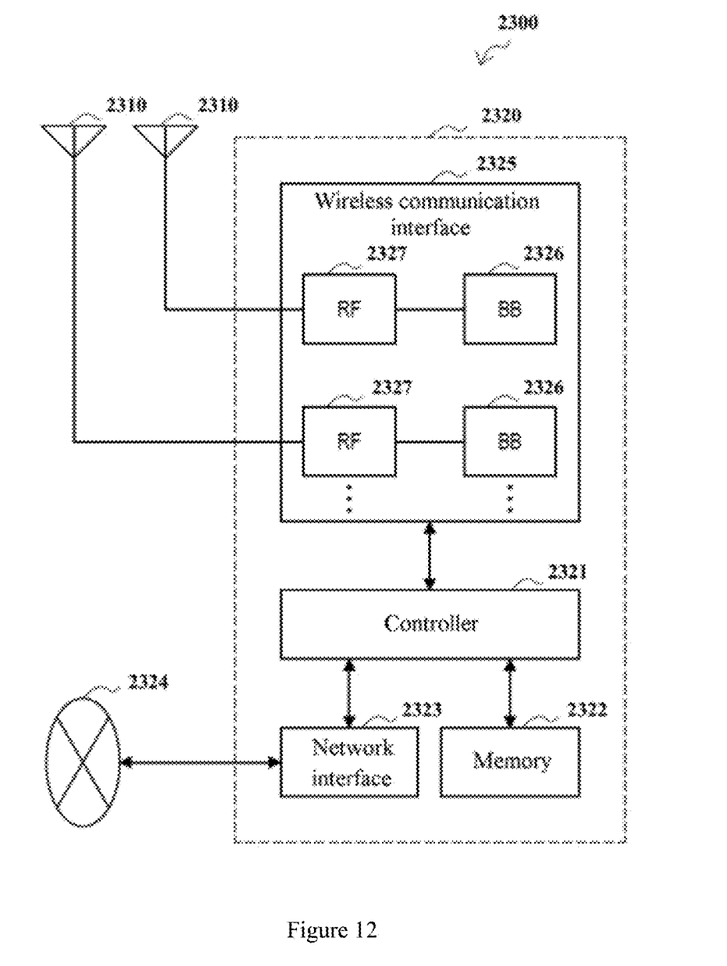
FIG. 12 is a block diagram showing an exemplary configuration of a gNB (a base station in a 5G system) to which the technology according to the present disclosure may be applied.

FIG. 12 is a block diagram showing an exemplary configuration of a gNB to which the technology according to the present disclosure may be applied. A gNB 2300 includes multiple antennas 2310 and a base station apparatus 2320. Each of the antennas 2310 is connected to the base station apparatus 2320 via a radio frequency (RF) cable.

Each of the antennas 2310 includes a single antenna element or multiple antenna elements (such as multiple antenna elements included in a multiple-input multiple-output (MIMO) antenna), and is used for the base station apparatus 2320 to transmit and receive a wireless signal. The gNB 2300 may include multiple antennas 2310, as shown in FIG. 12. For example, the multiple antennas 2310 may be compatible with multiple frequency bands used by the gNB 2300.

The base station apparatus 2320 includes a controller 2321, a memory 2322, a network interface 2323 and a wireless communication interface 2325.

The controller 2321 may be, for example, a CPU or a DSP, and operate various functions of a high layer of the base station apparatus 2320. For example, the controller 2321 generates a data packet based on data in a signal processed by the wireless communication interface 2325 and transmits the generated packet via the network interface 2323. The controller 2321 may bundle data from multiple baseband processors to generate a bundled packet and transmit the generated bundled packet. The controller 2321 may have a logic function that performs control such as radio resource control, wireless bearer control, mobility management, admission control, and scheduling. The control may be performed in combination with a nearby gNB or core network node. The memory 2322 includes an RAM and an ROM, and stores a program executed by the controller 2321 and various types of control data (such as a terminal list, transmission power data and scheduling data).

The network interface 2323 is a communication interface via which the base station apparatus 2320 is connected to a core network 2324. The controller 2321 may communicate with a core network node or another gNB via the network interface 2323. In this case, the gNB 2300 may be connected to the core network node or other gNB via a logical interface (such as an S1 interface and an X2 interface). The network interface 2323 may also be a wired communication interface or a wireless communication interface for wireless backhaul line. If the network interface 2323 is the wireless communication interface, the network interface 2323 may use a frequency band for wireless communication higher than a frequency band used by the wireless communication interface 2325.

The wireless communication interface 2325 supports any cellular communication scheme (such as long term evolution (LTE) and LTE-Advanced), and provides wireless connection to a terminal positioned in a cell of the gNB 2300 via an antenna 2310. The wireless communication interface 2325 may include, for example, a BB processor 2326 and RF circuitry 2327. The BB processor 2326 may perform, for example, encoding/decoding, modulating/demodulating and multiplexing/de-multiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be implemented as a memory storing a communication control program, or a module including a processor configured to execute a program and related circuitry. The function of the BB processor 2326 may be changed by updating the program. The module may be a card or blade inserted into a slot of the base station apparatus 2320. Alternatively, the module may be a chip mounted on the card or the blade. Further, the RF circuitry 2327 may include, for example, a mixer, a filter or an amplifier, and transmits and receives a wireless signal via the antenna 2310.

As shown in FIG. 12, the wireless communication interface 2325 may include multiple BB processors 2326. For example, the multiple BB processors 2326 may be compatible with multiple frequency bands used by the gNB 2300. As shown in FIG. 12, the wireless communication interface 2325 may include multiple RF circuitry 2327. For example, the multiple RF circuitry 2327 may be compatible with multiple antenna elements. Although FIG. 12 shows an example in which the wireless communication interface 2325 includes multiple BB processors 2326 and multiple RF circuitry 2327, the wireless communication interface 2325 may include a single BB processor 2326 or single RF circuitry 2327.

In the gNB 2300 shown in FIG. 12, the transceiving device of the wireless communication apparatus for base station side according to an embodiment of the present disclosure may be implemented by the wireless communication interface 2325. At least a part of functions of the processing circuitry and/or units of the electronic device or the wireless communication apparatus for base station side may be implemented by the controller 2321. For example, the controller 2321 may perform at least a part of functions of the processing circuitry and/or the units of the electronic device or the wireless communication apparatus for base station side by executing the program stored in the memory 2322.

In the above description of specific embodiments of the present disclosure, features described and/or illustrated for one embodiment may be used in one or more other embodiments in the same or similar manner, or may be combined with features in other embodiments, or may replace features in other embodiments.

It should be emphasized that terms of "include/comprise" used herein indicate presence of a feature, an element, a step, or a component, but do not exclude presence or addition of one or more other features, elements, steps or components.

In the above embodiments and examples, reference numerals consist of numbers are used to represent steps and/or units. Those skilled in the art should understand that these reference numerals are only for purpose of illustration and drawing and are not indicative of the order or any other limitations thereof.

In addition, the method according to the present disclosure is not limited to be performed in the chronological order described herein, and may be performed in other chronological order, in parallel or independently. Therefore, the order in which the method is performed described herein does not limit the technical scope of the present disclosure.

Although the present disclosure is described above through the specific embodiments of the present disclosure, it should be understood that all embodiments and examples described above are illustrative rather than restrictive. Various modifications, improvements and equivalents may be made to the present disclosure by those skilled in the art within the scope and spirit of the attached claims. These modifications, improvements or equivalents should fall within the protection scope of the present disclosure.

The invention claimed is:

1. An electronic device for wireless communication, comprising processing circuitry configured to:
    select, from among a plurality of resource blocks allocated in advance on an unlicensed band, a resource block to be used for automatic uplink transmission; and
    perform control to perform the automatic uplink transmission using the selected resource block,
    wherein the processing circuitry selects the resource block to be used for the automatic uplink transmission by:

determining a resource block priority of each resource block of the plurality of resource blocks, and selecting the resource block to be used for the automatic uplink transmission based on the determined resource block priority, wherein the processing circuitry is further configured to:

perform a first listen-before-talk for each of the plurality of resource blocks, and determine the resource block priority based on a result of the first listen-before-talk, before performing the uplink transmission using the selected resource block, perform a second listen-before-talk with respect to the selected resource block, and for uplink services of different types, set different start timings for the second listen-before-talk.

2. The electronic device according to claim 1, wherein the processing circuitry is configured to:

determine the resource block priority for each of a plurality of types of uplink services respectively, and select a resource block to be used for an uplink service of a corresponding type based on the determined resource block priority.

3. The electronic device according to claim 2, wherein the plurality of types of uplink services comprises uplink services having different requirements in terms of latency and/or transmission data volume.

4. The electronic device according to claim 2, wherein the plurality of types of uplink services comprises an Ultra Reliable Low Latency Communications (URLLC) service and an Enhanced Mobile Broadband (eMBB) service.

5. The electronic device according to claim 4, wherein the processing circuitry is configured to:

for the URLLC service, when a first resource block has a latency lower than a second resource block, set a first resource block priority for the first resource block and a second resource block priority for the second resource block, wherein the first resource block priority is higher than the second resource block priority; and for the eMBB service, when a first resource block has a size larger than a second resource block, set a first resource block priority for the first resource block and a second resource block priority for the second resource block, wherein the first resource block priority is higher than the second resource block priority.

6. The electronic device according to claim 5, wherein the processing circuitry is configured to:

for the URLLC service, when a first resource block has a Maximum Channel Occupancy Time (MCOT) smaller than a second resource block, set a first resource block priority for the first resource block and a second resource block priority for the second resource block, wherein the first resource block priority is higher than the second resource block priority.

7. The electronic device according to claim 1, wherein the processing circuitry is configured to:

in a case where the second listen-before-talk fails or the uplink transmission fails, perform the uplink transmission using another resource block having a resource block priority lower than the selected resource block.

8. The electronic device according to claim 1, wherein the processing circuitry is configured to: set a start timing of the second listen-before-talk for an Ultra Reliable Low Latency Communications (URLLC) service to be earlier than a start timing of the second listen-before-talk for an Enhanced Mobile Broadband (eMBB) service.

9. The electronic device according to claim 1, wherein the plurality of resource blocks are allocated jointly by a base station to a plurality of user equipments.

10. The electronic device according to claim 9, wherein the plurality of resource blocks are allocated by the base station via radio resource control signaling.

11. A wireless communication method performed by an electronic device, the method comprising:

selecting, from among a plurality of resource blocks allocated in advance on an unlicensed band, a resource block to be used for automatic uplink transmission; and performing the automatic uplink transmission using the selected resource block, wherein the selecting comprises:

determining a resource block priority of each resource block of the plurality of resource blocks, and selecting the resource block to be used for the automatic uplink transmission based on the determined resource block priority, wherein the method further comprises:

performing a first listen-before-talk for each of the plurality of resource blocks, and determine the resource block priority based on a result of the first listen-before-talk, before performing the uplink transmission using the selected resource block, performing a second listen-before-talk with respect to the selected resource block and for uplink services of different types, setting different start timings for the second listen-before-talk.

* * * * *